May 19, 1925.

H. C. ODEN 1,538,733

MILKING MACHINE

Filed Aug. 27, 1919

Henry Clyde Oden
INVENTOR.

BY
Edwin P. Corbett
ATTORNEY.

May 19, 1925.

H. C. ODEN

MILKING MACHINE

Filed Aug. 27, 1919

Henry Clyde Oden
INVENTOR.

BY
Edwin P. Corbett
ATTORNEY.

Patented May 19, 1925.

1,538,733

UNITED STATES PATENT OFFICE.

HENRY CLYDE ODEN, OF COLUMBUS, OHIO, ASSIGNOR, BY MESNE ASSIGNMENTS, TO PINE TREE MILKING MACHINE COMPANY.

MILKING MACHINE.

Application filed August 27, 1919. Serial No. 320,096.

*To all whom it may concern:*

Be it known that I, HENRY CLYDE ODEN, a citizen of the United States of America, residing at Columbus, in the county of Franklin and State of Ohio, have invented certain new and useful Improvements in Milking Machines, of which the following is a specification.

My invention relates to milking machines and has particular reference to the valve structure of such machines and the parts associated therewith. It results in the elimination of a number of parts, hitherto considered indispensable, and the attainment of results by a markedly simplified structure capable of an efficiency of which the previous and relatively complicated structures in the art are incapable.

My invention is particularly applicable in connection with milking machines of that type embodying teat cups comprised of inner suction chambers and outer pulsating chambers. In this form of device, it is more or less customary to utilize a source of vacuum and a pulsating element, this pulsating element being operated by the intermittent application of vacuum to different points thereof and this vacuum being applied constantly to the inner chambers of the teat cups and intermittently to the outer or pulsating chambers of such teat cups.

I have solved a very difficult problem in an extremely simple way by providing a single valve which is automatically operative to control the application of vacuum intermittently to both the pulsating element and the pulsating chambers of the teat cups. Furthermore, under my invention, this result is attained in such a way that the vacuum is applied to the pulsating chambers of the teat cups by passages which are independent of the passages by which the vacuum is applied to the pulsating element. These passages are not only independent but they are so connected to the source of vacuum that any fluid or moisture that may get into the passages leading from the pulsating chambers to the teat cups is absolutely precluded from entering the passages by which the vacuum is applied to the pulsating element. This independence of structure and operation is highly important as bearing upon the longevity of the pulsating element. Hitherto, the leakage of moisture and other extraneous material into the parts of the pulsating element has been a source of much trouble in the way of causing clogging and sticking of the parts. This structure absolutely precludes this. And I have accomplished this result by the use of only one valve for controlling the intermittent application of vacuum to both of these parts.

As this description progresses, it will appear that I have provided other features of novelty and importance, such for instance as a single vacuum chamber carried by the pulsating element and from which lead the passages which apply the vacuum to the inner chambers of the teat cups, the outer or pulsating chambers of such teat cups, and the pulsating element. Likewise, the manner of connecting the passages or conduits to the valve seat and the novel way in which the valve is held in such valve seat against tilting will both appear to be features of novelty and importance.

Another feature of my invention arises from the peculiarly simple and effective means devised for holding the oscillating valve in its different positions of adjustment. It will be seen that I have accomplished this without the use of any additional parts whatever, merely providing keeper depressions in the piston rod of the pulsating element.

The preferred embodiment of my invention is shown in the accompanying drawings wherein similar characters of reference designate corresponding parts and wherein—

Figure 1:
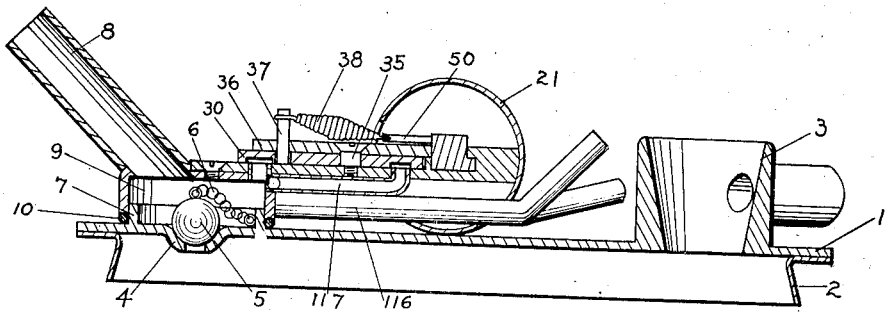
Figure 1 is a transverse section of a milk pail cover showing the parts of my apparatus applied thereto.

In the drawings, the milk pail cover is designated 1 and carries an annular flange 2. At one side this cover is provided with a valve seat 3 for a spigot (not shown). At a point substantially diametrically opposite to this valve seat, the cover is provided with a perforate depression 4 in which a ball check valve 5 is mounted, this ball valve being loosely connected to the lid by a chain 6. There is an annular upstanding flange 7 supporting and preferably concentric to the depression 4. It will be understood that the perforation in this depression affords a direct communication to the interior of the parts.

The pulsator and valve structure is mounted upon the milk pail cover as a single unit that may be removed at one operation, the structure being connected to the milk pail cover by a readily releasable holding device (not shown). The structure comprises a pulsator, a valve structure, a vacuum chamber and various connecting conduits and passages for the application of the vacuum. The vacuum is rendered effective upon the various parts through the medium of a main pipe or conduit 8 which leads into a cylindrical chamber 9 closed at its upper end and at its lower end embracing and closely fitting the upstanding flange 7. This cylinder member rests upon a gasket 10 and in this manner forms an air-tight chamber immediately over the ball valve 5. At this point, it should be understood that vacuum is applied to the inner chambers of the teat cups through the pipe 8, the chamber formed by the cylinder 9, the perforation in the depression 4, the interior of the pail and through the ports of the valve 3 which are under the control of the spigot (not shown). This application of vacuum is constant when the spigot is so turned as to open one or more ports in the valve 3, at least one of these ports being open when the milking machine is in operation.

In addition to this constant application of vacuum, the aim of this apparatus is to provide a simple and efficient mechanism for intermittently applying vacuum to the outer or pulsating chambers of the teat cups and to different points in the pulsator. The conduits or ducts which connect the vacuum to the outer or pulsating chambers of the teat cups are designated 14, 15 and 16. They preferably comprise short pipes the center one 14 of which opens at its lower end in the chamber formed by the cylinder 9 and opens at its upper end in the valve seat. The other ducts 15 and 16 are connected with pipes 115 and 116 which lead to the outer or pulsating chambers of the teat cups. In operation, the ducts 15 and 16 are alternately connected with the duct 14 and when one is connected with this duct the other is open to the atmosphere. This operation is brought about by the structure of valve used as will appear from Figure 2 of the drawings.

The pulsator is shown in the drawings as comprising a cylinder 21 within which is adapted to reciprocate a double headed piston element comprised of piston heads 22 and 23 and the connecting piston rod 24. Connected to either end of the cylinder 21 are pipes 119 and 118 which lead to the valve seat and terminate in ports 18 and 19. These ports 18 and 19 are disposed on opposite sides of a port 17 which is connected by means of a conduit 117 to the interior of the chamber formed by the cylinder 9. These ports 17, 18 and 19 are likewise subject to the single valve to be described and in operation while 17 and 18 are connected by means of this valve, 19 is open to the atmosphere. Likewise, when 17 and 19 are connected by means of the valve, port 18 is open to the atmosphere.

Figure 2:
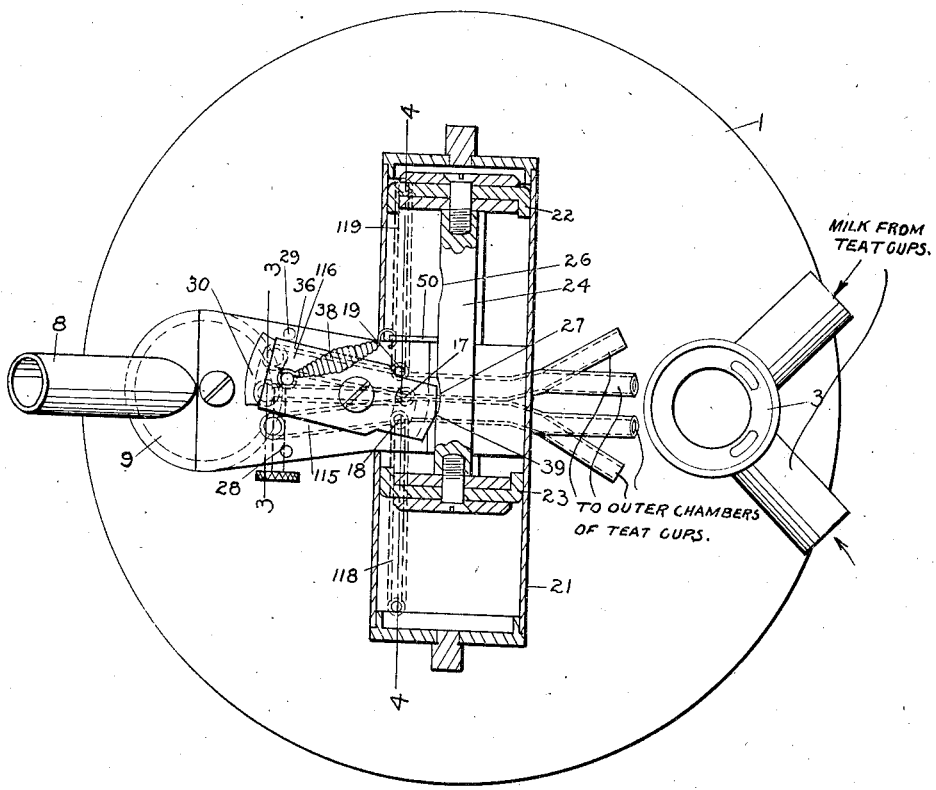
Figure 2 is a plan view of the structure shown in Figure 1 with the pulsator shown in section.
Figure 4:
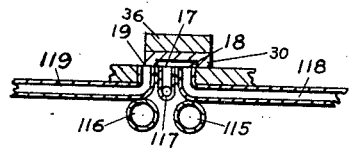
Figure 4 is a detail section on line 4—4 of Figure 2, showing the valve and the conduits controlled thereby which lead to the opposite ends of the pulsator.
Figure 5:
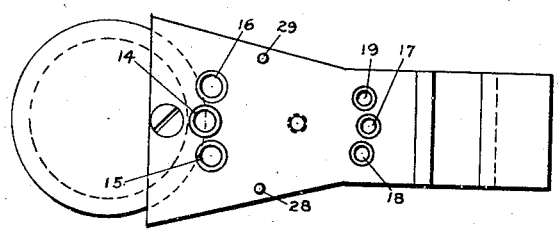
Figure 5 is a plan view of the valve seat and vacuum chamber with the other parts removed therefrom.
Figure 6:
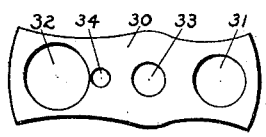
Figure 6 is a bottom plan view of the valve used by me.
Figure 8:
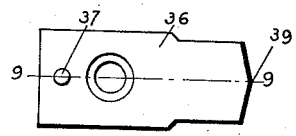
Figure 8 is a plan view of the lever element that I utilize for cooperation with the pulsator to shift the valve into its various positions.
Figure 7:
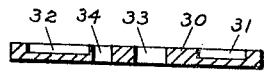
Figure 7 is a longitudinal section of this valve in inverted position.
Figure 9:
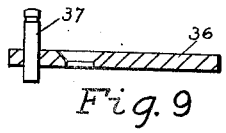
Figure 9 is a section taken on line 9—9 of Figure 8.
Figure 10:
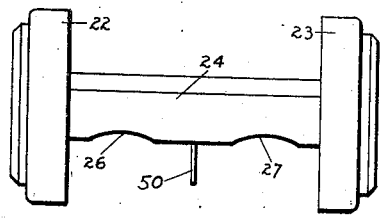
Figure 10 is a detail view of the double piston element of the pulsator shown removed from its casing.

The valve structure which accomplishes these results is shown in detail in Figures 4, 5 and 6 and is shown assembled in Figures 1 and 2. It comprises a member 30 with circular depressions 31 and 32 in opposite ends of its under surface, and with circular perforations 33 and 34 extending therethrough at different points along its longitudinal center. This valve 30 is placed upon the valve seat with its depressions downward and is designed to move freely about a center post 35. Held in superimposed relation to the valve is a connecting lever in the form of a plate 36 that is likewise designed to move about the post 35 and that carries a pin 37 extending both above and below the lever. The lower extension of this pin 37 fits loosely in the opening 34 of the valve while its upper extension is designed for connection to a coil spring 38 whose other end is connected to a pin 50 extending at right angles from the piston rod 24. The end of the lever 36 that is adjacent to the piston rod 24 is of angular form as shown at 39 so that it may cooperate with release depressions 26 and 27 formed in the piston rod 24.

Figure 3:
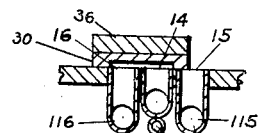
Figure 3 is a detail section on line 3—3 of Figure 2, showing the valve and the conduits controlled by said valve which lead to the outer chambers of the teat cups.

In operation, vacuum is constantly applied to the inner chambers of the teat cups through the chamber formed by the cylinder 9, through the pail by way of the check valve 5 and the port which it covers, and by way of the spigot and valve member 3. In way of the spigot and valve member 3. In the parts as shown in Figures 2, 3 and 4, the vacuum will be applied to the pulsator from cylinder 9 through conduit 117 and through conduit 118. The form of the valve is such that, at this time, atmospheric air is permitted to enter port 19 and pass to the opposite end of the cylinder by means of conduit 119. The result is that the double-headed piston will start to move toward the opposite end of its cylinder. As it continues to move, the spring 38 is gradually placed under tension but the angular end 39 of the lever 36 will be retained by the surface between depressions 26 and 27 until the double-headed piston member has reached a predetermined point. At this time, the spring 38 has passed the dead-center point and then the end 39 of the lever enters depression 26 and the spring will pull the lever to its opposite position. It will be noted that the valve lever is limited as to movement in either direction by stops 28 and 29. When this valve lever is snapped into its opposite position, it carries the valve with it by means of the pin 37 extending into the opening 34 of the valve. When this occurs, the structure of the valve is such that the port 18 is open to the atmosphere and the ports 17 and 19 are connected by the depression 31 with the result that the vaccum is applied to the opposite end of the cylinder by way of conduit 117, port 17, port 19 and conduit 119. Retracing slightly it will be seen that with the parts as shown in Figure 2 the ports 14 and 16 are connected by means of the depression 32 and at this time vacuum is being applied to the outer chambers of certain of the teat cups while atmospheric air has access to others of the teat cups. When the valve is snapped over, however, by the movement of the double-headed piston as just described, ports 14 and 15 are connected by the depression 32 so as to relieve port 16 of the outer chamber of the teat cup to which it is connected and at the same time to apply vacuum to the inner chambers of the teat cups to which the port 15 is connected. The application of this vacuum to these outer chambers of the sets of teat cups which are alternately affected may be readily traced as being from the cylinder 9 through the port 14 and the port 16 and through the conduit 116 or, on the other hand, through the port 14, port 15 and through conduit 115.

It will be apparent from this description that the snapping of the valve into alternate positions automatically controls the application of vacuum both to the pulsator and to the outer chambers of the teat cups. In other words, the outer chambers of one set of teat cups are being subjected to vacuum while the outer chambers of another set of teat cups are receiving atmospheric air. Then, upon the movement of the valve, the operation is reversed and the outer chambers which have been subjected to vacuum are subjected to atmospheric air while those outer chambers which have been subjected to atmospheric air are subjected to vaccum. In synchronism with this operation, opposite ends of the cylinder are alternately subjected to atmospheric air and vacuum.

It is important to note that the conduits which lead into the valve seat and form the ports thereof are of a material which is relatively softer than the material of which the valve seat is formed with the result that any wearing upon the valve seat will inevitably take place to at least the same degree upon the ports in such valve seat. It will furthermore be apparent that the structure by which the valve operating lever cooperates with the piston of the cylinder calls for no additional parts and merely consists of the depressions in the piston rod in conjuction with the complemental shaping of the end of the valve lever. It will be further understood that the device is not limited to the use of vacuum in order to effect its operations but that air or water under pressure may be utilized if desired.

It will be apparent that I have provided an extremely simple and compact structure by which the application of the vacuum may be adequately controlled automatically and effectively. The ports through which the vacuum is applied intermittently are under the control of a single valve and this single valve is of such structure that the very action of the vacuum in these ports will firmly hold the valve against its seat at points which are relatively spaced. The result is that all danger of tilting such as is liable to occur due to the action of the spring 38 and for other reasons is fully obviated.

Having thus described my invention, what I claim is:

1. A milking machine of the type designed to supply vacuum to teat cups comprising a pulsator comprising an element reciprocable by the varying of the fluid pressure alternately at opposite ends thereof, conduits for effecting the subjection of the ends of said elements alternately at such variations, conduits for subjecting said teat cups to varying degrees of fluid pressure, conduits for connecting the teat cups to vacuum, and a single valve for rendering said conduits effective at proper times, said conduits and valve structure being so constructed that the respective connections when made between the vacuum and pulsator ends and between the vacuum and said teat cups lead to their proper points independently of each other.

2. The combination of a pulsator and valve structure for milking machines comprising a reciprocating piston rod, an oscillating valve member, spaced depressions in said rod forming alternate release for one end of said valve member, and a spring member for snapping said valve member past dead center, 3. In a milking machine combination of a pulsator ducts leading to the pulsating chambers of teat cups, and a single valve which automatically controls the alternate application of fluid pressure to operate the pulsator and to operate the pulsating chambers said single valve effecting these applications independently of each other.

4. A valve structure for milking machines comprising a valve seat with spaced sets of ducts, and a valve element loosely mounted upon said seat and held in non-tiltable position upon its seat by vacuum effective at spaced points through said spaced sets of ducts.

5. A valve structure for milking machines comprising a valve seat with sets of ducts arranged at both ends thereof, and a valve element loosely mounted upon said seat and held in non-tiltable position by vacuum applied at opposite ends of said valve element by said sets of ducts.

6. A valve structure for milking machines comprising a valve seat with spaced sets of ducts, a valve element, a post in said seat upon which said valve is loosely mounted while resting on said seat, and sets of ducts upon opposite sides of said post, said valve element being held in close and non-tiltable relation to said valve seat by vacuum applied through said sets of ducts.

7. A milking machine of the type designed to supply vacuum to teat cups comprising a source of vacuum in combination with a pulsator, single vacuum chambers, connections from said vacuum chambers direct to the teat cups and to the pulsator and connections through the pail and through a single outlet to the teat cups.

8. A milking machine of the type designed to supply fluid pressure to pulsating teat cups, comprising a vacuum chamber, a pulsator, conduits directly connecting said chamber to the pulsator and to the teat cups, and a single means for independently varying the fluid pressure in the conduits leading to the pulsator and independently varying the fluid pressure in the conduits leading to the teat cups.

9. A milking machine of the type designed to supply fluid pressure to pulsating teat cups, comprising a vacuum chamber, a pulsator, conduits directly connecting said chamber to the pulsator and to the teat cups, and a single means for independently and alternately varying the fluid pressure in the conduits leading to the pulsator and independently and alternately varying the fluid pressure in the conduits leading to the teat cups.

10. A valve structure for milking machines comprising a valve seat with ports controlling the application of fluid pressure to the teat cups and the pulsator, and a valve element for alternately varying the fluid pressure in the teat cup ports and in the pulsator ports, said valve element having but one depression for cooperation with the teat cup ports and one for cooperation with said pulsator ports.

In testimony whereof I hereby affix my signature.

HENRY CLYDE ODEN.